July 28, 1942.          H. E. WELLS          2,291,518
SELF-CENTERING DEVICE
Filed Dec. 20, 1938          2 Sheets-Sheet 1

Inventor
HAROLD E. WELLS
By Semmes, Keegin & Semmes
Attys

July 28, 1942.   H. E. WELLS   2,291,518
SELF-CENTERING DEVICE
Filed Dec. 20, 1938   2 Sheets-Sheet 2
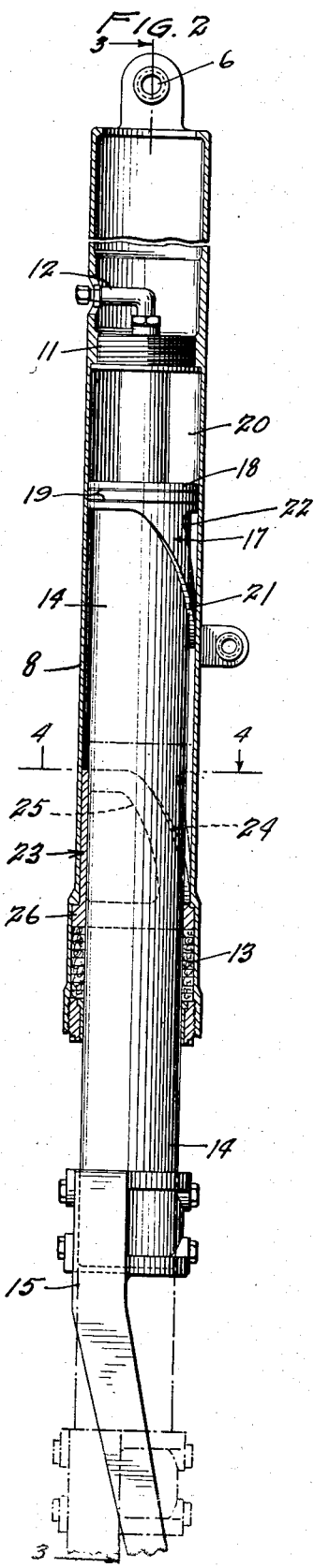
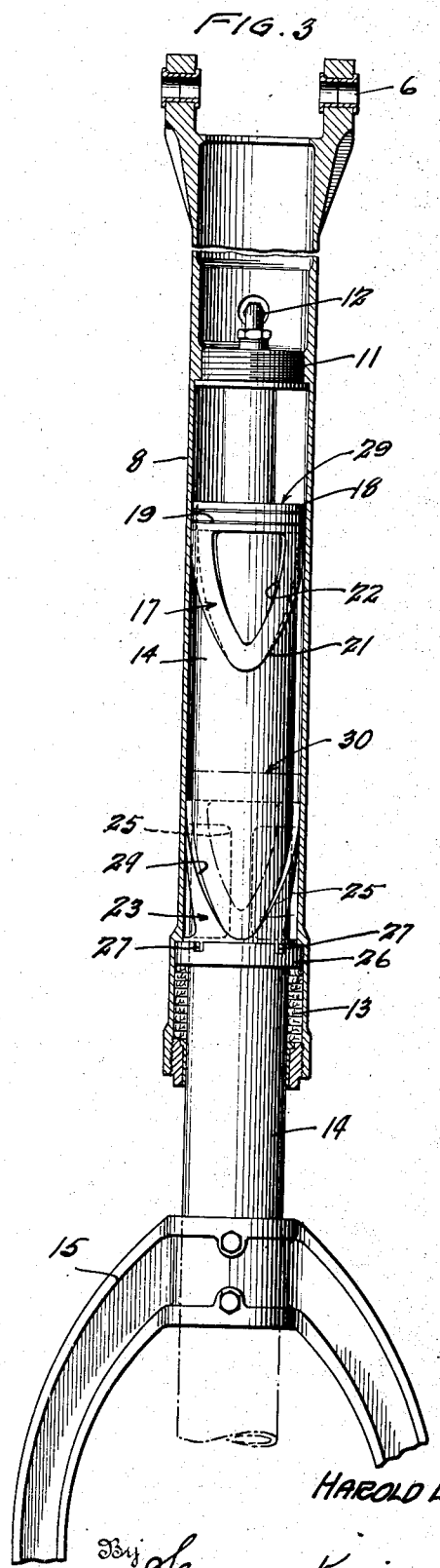
Inventor
HAROLD E. WELLS
By Semmes, Keegin & Semmes
Attorneys Patented July 28, 1942

2,291,518

UNITED STATES PATENT OFFICE 2,291,518

SELF-CENTERING DEVICE

Harold E. Wells, Kenmore, N. Y., assignor, by mesne assignments, to The Cleveland Pneumatic Tool Company, Cleveland, Ohio, a corporation of Ohio Application December 20, 1938, Serial No. 246,905

2 Claims. (Cl. 244—104)

This invention relates generally to airplane construction, and more especially to a means by which the alignment of a caster wheel may be insured.

One of the objects of my invention is to provide a device, the operation of which will insure proper alignment of a caster wheel so that it may be retracted into a compartment without damage to the wheel or associated parts of the airplane.

Still another object of my invention is to provide a device, the operation of which will insure the proper alignment of a caster wheel in the direction of travel maintained by an airplane just before the wheel comes into contact with the ground.

A further object of my invention is to provide a self-centering device of the type described which is so constructed and positioned that its use will not increase the weight or drag of the wheel assembly to which it is attached.

With these and other objects in view, my invention embraces the concept of providing a means, the operation of which will insure the alignment of a caster wheel at any desired angle. In practice, my device may be applied to any type of strut upon which is mounted a caster wheel. The strut may also be attached to any desired portion of the fuselage of an airplane and may or may not be retractible.

In order to illustrate my invention, I have shown the self-centering device in combination with a retractible compression leg of the air cushioning, oleo type which is attached to the forward portion of an airplane to assist in landing. The compression leg comprises a fixed cylinder and a slidable and rotatable piston carried partially within the cylinder. The piston carries on its projecting end a rigid fork in which is mounted the landing wheel. The centering device which forms this invention is associated with the cylinder and piston and is entirely enclosed within the cylinder, thus eliminating any additional drag or possibility of damage to the working parts. Also being entirely automatic in operation, it insures the pilot of proper alignment of the wheel both in landing and before retraction without the necessity of manipulation.

In the drawings:

Figure 2 is a longitudinal, sectional view of the compression leg in parts, being shown in elevation.

Figure 3 is a view taken along line 3—3 of Figure 2, looking in the direction of the arrows.

Figure 4 is a view taken along line 4—4 of Figure 2, looking in the direction of the arrows.

Figure 1:
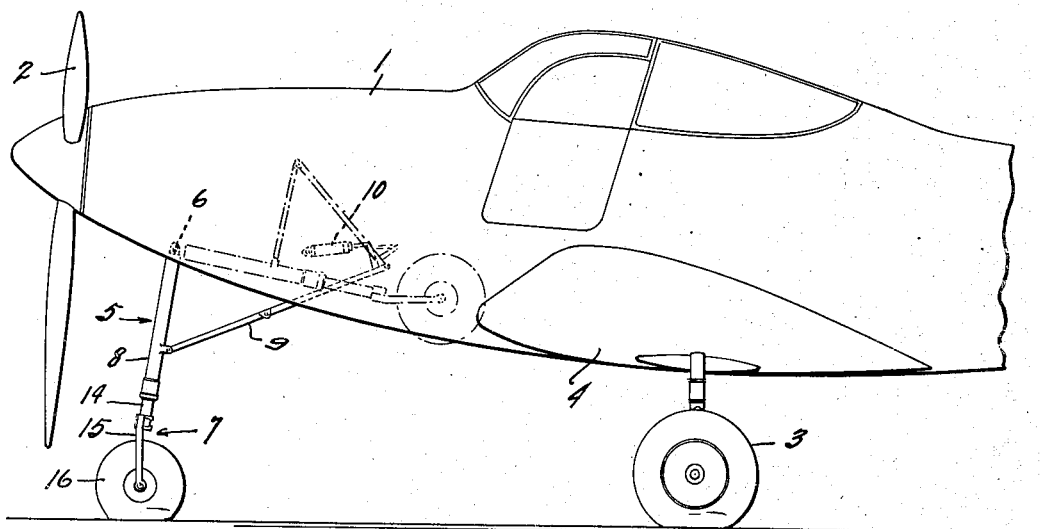
Figure 1 is a fragmental view in side elevation of the fuselage of an airplane showing a swiveling nose wheel in extended and retracted positions.

In order to illustrate my invention, I have shown in Figure 1 a portion of the fuselage of an airplane, generally indicated by the numeral 1, which is provided with a propeller 2, a landing wheel 3 and a main airfoil 4. Attached to the fuselage forward of the airfoil 4 is a compression leg of the air cushioning, oleo type, which is indicated generally by the numeral 5. This leg is hinged to the fuselage as shown at 6 and consists of a pivoting nose wheel assembly 7 which is mounted in a cylinder 8.

Attached to the outer surface of the cylinder 8 is a broken link 9 which connects the leg 5 to the retracting device, such as a cylinder 10, which is mounted on the fuselage 1. The operation of the retracting device 10 will cause the extension or retraction of the leg 5 as indicated by dotted lines.

As best shown in Figures 2 and 3, the cylinder 8 consists of a hollow tube, the upper portion of which is provided with a closure member 11 to which is attached a filling fitting 12. The lower end of the cylinder is provided with a packing gland 13.

A piston 14 is provided which extends through the gland 13 and carries on its outer extremity a wheel fork 15 upon which is mounted a wheel 16. The piston 14 is slidably mounted within the cylinder 8 in such a manner that it can be rotated through a predetermined arc.

Carried within the cylinder 8 and rigidly connected to the upper end of the piston 14 is a cam follower 17. This cam follower is provided with an annular upper end 18 which is provided with oil grooves 19. These oil grooves act as a seal to prevent cushioning air from escaping past the cam follower 17 from the air space 20, the size of which varies with the distance separating the annular upper end 18 from the upper enclosure 11. The lower end of the cam follower 17 consists of a wedge-shaped depending portion 21 which is cut away as at 22 in order to reduce weight.

Mounted in the cylinder 8, below the cam follower 17, is a cam 23 which is provided with a cam surface 24, the shape of which corresponds to that of the cam follower surface 21. This surface 24 is also cut away as shown at 25 to reduce weight.

The lower end of the cam 23 is flanged as shown at 26. This flanged portion is provided with key seats 27 in which are adapted to fit keys 28 which are in turn keyed into the interior of the cylinder 8. This construction prevents movement or rotation of the cam 23.

In operation, when the piston 14 is relieved of its working load, as, for example, when the airplane leaves the ground, air pressure within the air space 20 and the weight of the wheel 16 force the piston 14 downward, thereby causing the cam follower 17 which is attached to the piston 14 to move downwardly from its static position shown at 29 in Figure 3.

Figure 5:
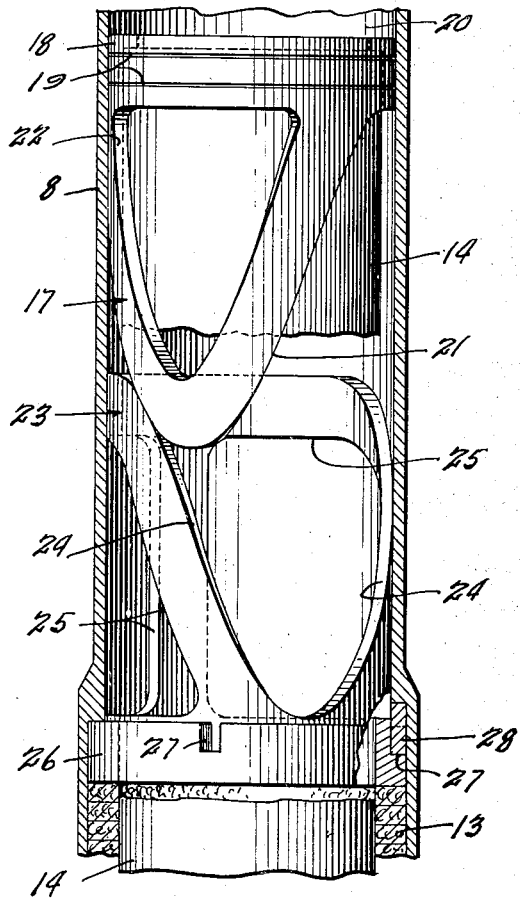
Figure 5 is a longitudinal, sectional view of a portion of the compressible leg showing in side elevation the cooperating parts of the centering device in a displaced position.
Figure 9:
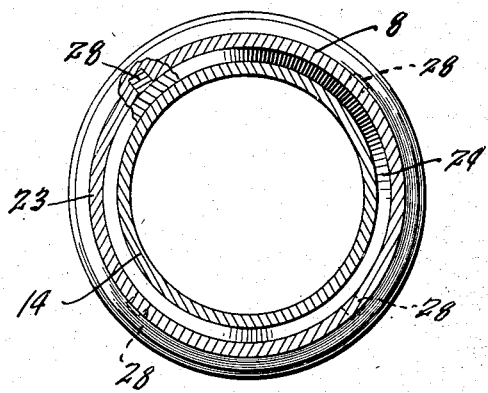

As best shown in Figure 5, this movement of the cam follower 17 brings its surface 21 in contact with the similarly shaped surface 24 of the cam 23. The continued downward movement of the cam follower 17 forces the surface 21 to follow the cam surface 24 until the two surfaces completely coincide in the maximum extended position of the piston 14 as shown at 30 in Figure 3.

In assuming this position, the cam follower 17, in addition to its longitudinal movement, has been forced to rotate on its own axis, thereby rotating the piston 14 and the wheel fork 15 which results in proper alignment of the wheel 16, such as in a direction similar to that taken by the airplane.

The leg may now be retracted within the fuselage without danger of misalignment of the wheel causing damage to the wheel or fuselage. This position will be maintained until the wheel is again extended and the leg is compressed upon the wheel coming in contact with the ground when it is free to swivel for proper manipulation of the airplane in taxiing.

It is believed obvious from the above description that I have provided a device which will insure perfect alignment of a caster wheel so that it may be retracted into a compartment and also means whereby a wheel may be aligned with the direction of travel just before the wheel comes into contact with the ground. As this device is an integral part of and contained within the aero strut, there is little increase in weight and no increase in drag as would be the case if an external spring or other device were used for the same purpose.

While for purposes of illustration I have disclosed one method by which my alignment device may be applied for aligning a wheel, it is obvious that this device can be used in any construction whereby one part is longitudinally movable in relation to the other. It is therefore apparent that I do not intend my invention to be in any way limited by the disclosure, and I wish the scope of this invention to be only limited by the prior art and the breadth of the appended claims.

I claim:

1. A landing gear for aircraft comprising, the combination of a cylinder, a piston slidably and rotatably mounted within the cylinder, a wheel supported at the lower extremity of said piston, an annular cam follower rigidly mounted on the upper extremity of said piston, said cam follower being provided with a downwardly depending laterally hollow portion having a curved surface, a cam within the cylinder, said cam being rigidly attached to the cylinder at a point below the cam follower and being provided with an upstanding member having a surface which is curved in a manner similar to that of said cam follower, and means to force the piston downwardly in the cylinder so that the two surfaces will engage each other, thereby causing a partial rotation of the piston and the wheel to which it is attached.

2. A landing gear for aircraft comprising, the combination of a cylinder, a piston slidably and rotatably mounted within the cylinder, a wheel supported at the lower extremity of said piston, an annular cam follower rigidly mounted on the upper extremity of said piston, said cam follower being provided with a downwardly depending portion having a curved surface, a cam within the cylinder, said cam being rigidily attached to the cylinder at a point below the cam follower and being provided with an upstanding laterally hollow member having a surface which is curved in a manner similar to that of said cam follower, and means to force the piston downwardly in the cylinder so that the two surfaces will engage each other, thereby causing a partial rotation of the piston and the wheel to which it is attached.

HAROLD E. WELLS.